United States Patent Office 2,911,051
Patented Nov. 3, 1959

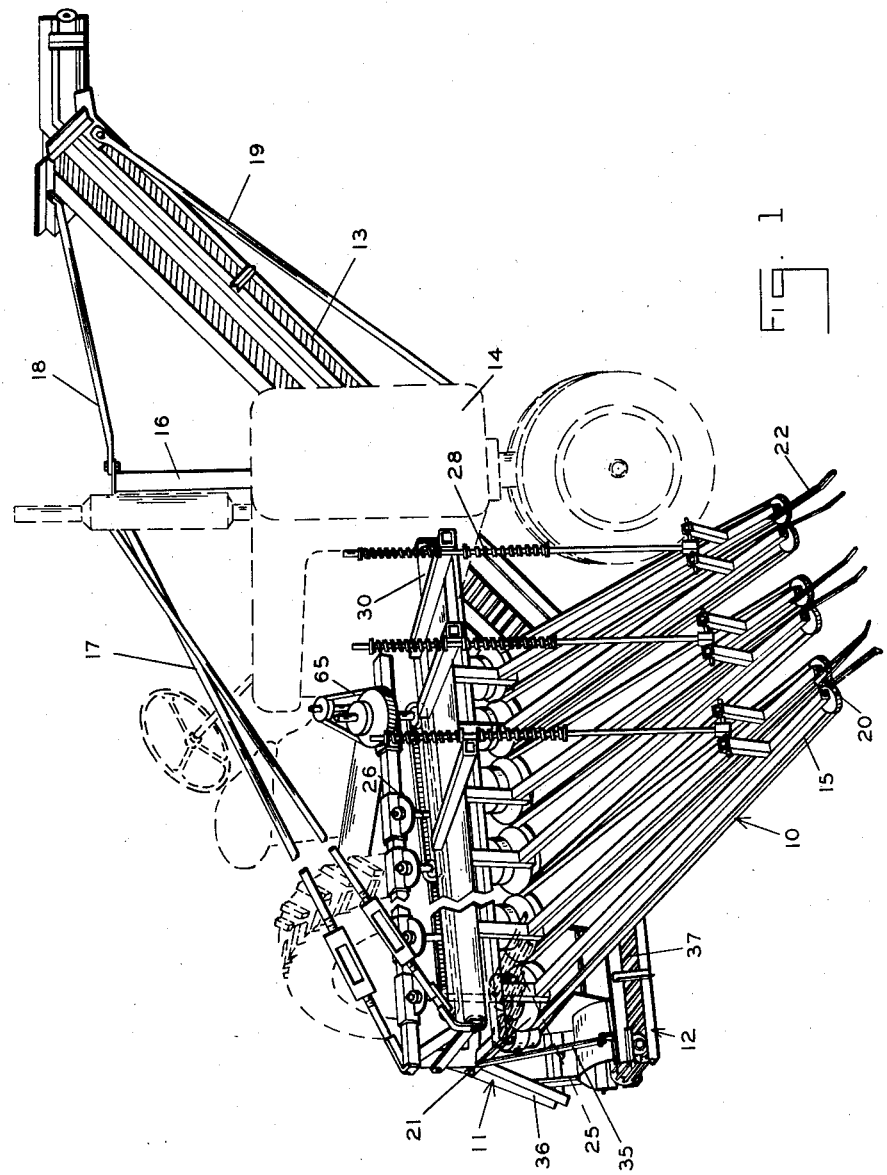

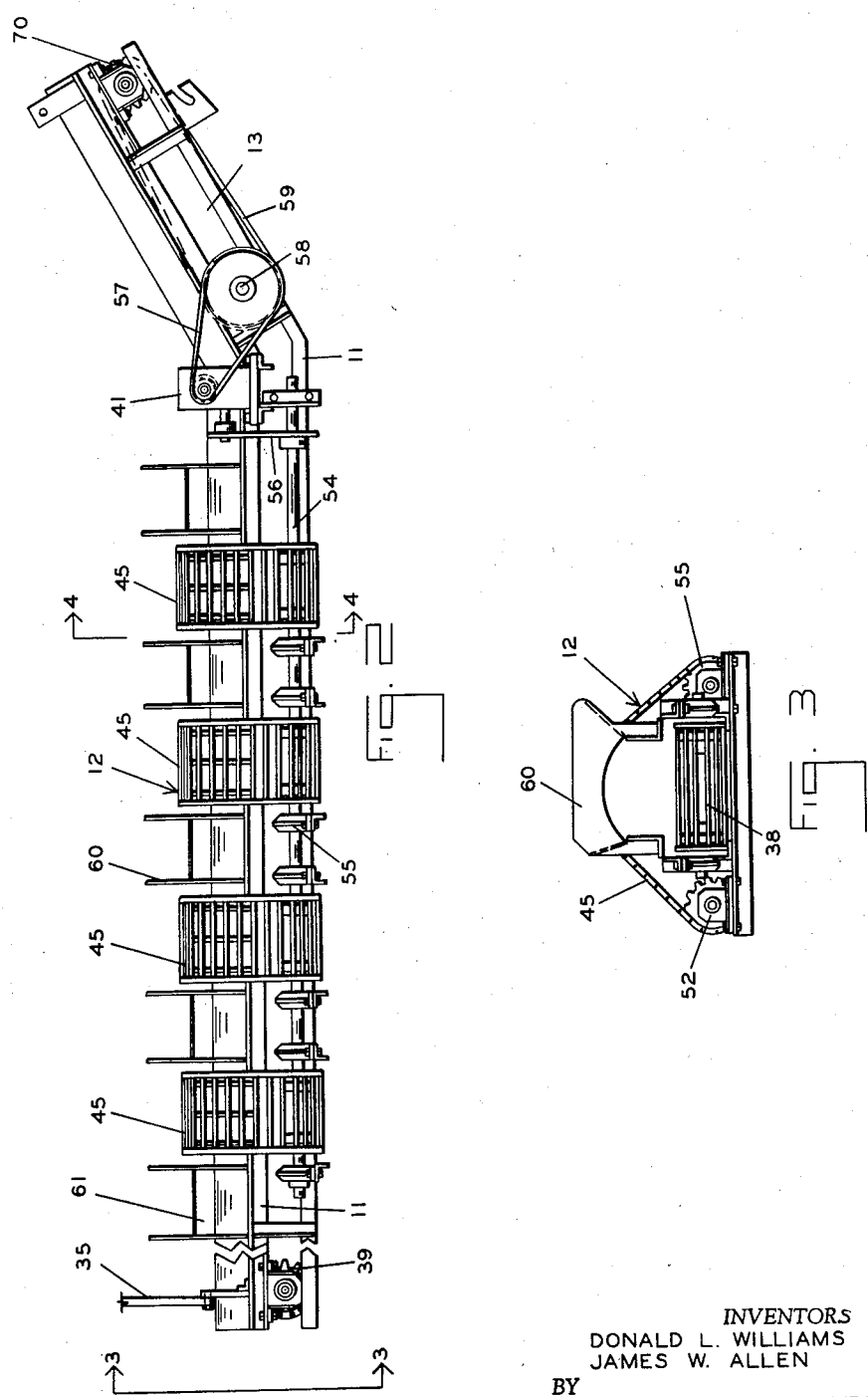

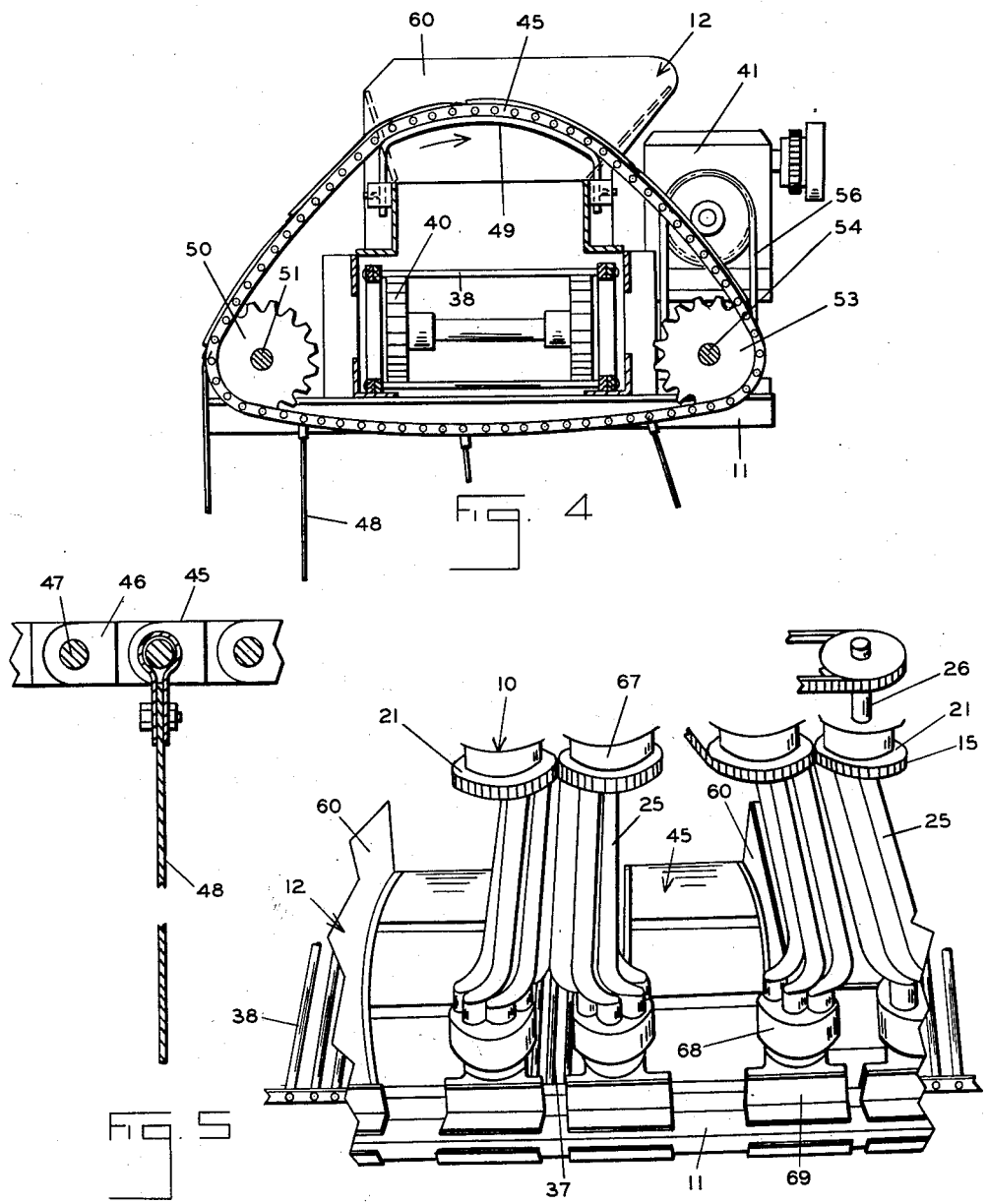

2,911,051

MULTIPLE ROW ROOT CROP HARVESTER

Donald L. Williams and James W. Allen, Columbus, Ohio, assignors to Tawco Products, Inc., Columbus, Ohio, a corporation of Ohio Application October 30, 1957, Serial No. 693,420

2 Claims. (Cl. 171—28)

Our invention relates to a multiple row root crop harvester. It has to do, more particularly, with a machine which includes a plurality of root harvesting units of the type disclosed in Krier et al. Patent No. 2,792,864 of May 21, 1957, and which has a conveyor system associated therewith that cooperates therewith in a special manner to make it possible to use a plurality of such units on one machine and still separate the plant roots and the tops and discard the tops without jamming of the units or the conveyor system.

The single row root crop harvesting unit disclosed in Patent No. 2,792,864 comprises a pair of upwardly inclined coacting conveyor belts, having a plow at their lower ends so that as the machine advances, the plants are loosened and conveyed upwardly. At the upper ends of the conveyor belts, topper bars are provided, which are of the general structure disclosed in Urschel Patent No. 1,942,011 into which the plants are positively forced, and which serve to snap or sever the tops from the roots and force them to one side, permitting the roots to drop into a container.

Attempts have been made to incorporate several of these single row units into a multiple row machine, but in multiple row machines which have been tried, considerable difficulty has been encountered in keeping the severed roots and tops separate and in conveying the roots without the tops to a receiver, without intermingling the tops therewith, and in conveying the severed tops to a discard point. Due to the nature of the tops, there has been a tendency for them to jam conveyor mechanisms of the type proposed in the past in connection with multiple row machines.

According to the present invention, we provide a multiple row root crop harvester which has a series of row harvesting units incorporated therein in association with a novel conveyor system which cooperates with the topping bars of the various units in such a manner that the plant roots and tops are separated and conveyed separately to predetermined points without jamming of the conveyor mechanism due to accumulation of severed tops.

The accompanying drawings illustrate our invention embodied in a multiple row root plant harvesting machine but it is to be understood that specific details thereof may be varied without departing from basic principles of the invention.

In these drawings:

Figure 1 is a perspective view of a machine embodying our invention.

Figure 2 is a front elevational view of the conveyor mechanism showing it removed from the machine.

Figure 3 is an end view taken along line 3—3 of Figure 2.

Figure 4 is an enlarged transverse vertical sectional view taken along line 4—4 of Figure 2.

Figure 5 is an enlarged detail of part of one of the plant top conveyors showing one of the flaps carried thereby.

Figure 6 is a perspective view showing how the conveyor mechanism is associated with the topper bars.

With reference to the drawings and particularly to Figure 1 thereof, we have illustrated a multiple row root plant harvesting machine which is suitable for harvesting various types of root crops, for example, radishes. The machine is adapted to move along a plurality of rows of the root plant crop, to engage and loosen the plants and lift them from the earth, to convey the plants upwardly and rearwardly into association with a detopping mechanism where the tops are removed, and to separate the tops and convey them to a point of discard while retaining the separated roots and conveying them to a receiver.

As shown in Figure 1, the machine comprises a plurality of single row root harvesting units 10, which in number depend upon the number of plant rows to be harvested simultaneously, that are suitably supported on a tractor-carried frame 11 and extend rearwardly and upwardly, a conveyer system 12, supported by the frame 11 in association with and transversely below the rear and upper ends of the units 10 for receiving the severed roots and tops therefrom and keeping them separated, and which includes an elevating conveyor section 13 for elevating the roots and depositing them in a suitable receiver, for example, a truck body. The frame 11 extends horizontally laterally from one side of the tractor 14 under the forward part of the tractor and then upwardly and outwardly to provide support for the elevating conveyor section 13. The frame 11 is suitably supported on the tractor frame by means including the guy rods 17 connected to the outer end of the horizontal part of the frame 11, the guy rod 18 connected to the upper end of the frame at the other side, all the guy rods having their inner ends connected to a standard 16 on the tractor frame, and the braces 19 having their inner ends connected to the tractor frame and their outer ends connected to the upper end of the frame 11.

As indicated previously, each of the harvesting units 10 is of the structure disclosed in Patent No. 2,792,864 and comprises a pair of upwardly inclined co-acting conveyor belts 15. Each belt 15 is carried by an idler pulley 20 at its lower end and by a drive pulley 21 at its upper end. Plows or plant-engaging members 22 are provided at the lower ends of the belts 15 of each unit and will engage the plants in the row and lift and direct them rearwardly between the two belts 15 which will grip the plants of the row successively, hold them upright, and carry them continuously upwardly and rearwardly. At the upper ends of the two belts 15 of the pair are the topper bars 25 which are of the general structure disclosed in Patents Nos. 1,942,011 and 2,792,864, as mentioned above. Each unit 10 operates exactly as described in Patent No. 2,792,864 so that as the machine advances and the unit moves along the row, the members 22 loosen the dirt around the roots of the plants ahead of the associated belts 15, and direct the plants between the lower ends of the pair of continuously driven belts 15. The plants are carried upwardly and rearwardly by the coacting belts 15 and are thrust positively thereby, when they reach the upper ends thereof, into the associated topper bars 25. The bars of each unit 10 are divided into two sets of relatively movable longitudinally extending bars which move in elliptical paths, gripping the tops of the plants therebetween and snapping or severing the tops from the roots. The cooperating elliptically moving bars move the plants longitudinally therealong until the severing of the tops from the roots when the roots drop downwardly and the tops are thrown to one side or the other of the bars.

The upper drive pulleys 21 for each belt 15 of each unit 10 are driven by a suitable drive 26 which is like that disclosed in Patent No. 2,792,864 actuated by a chain drive 65 from the power take-off (not shown) of the tractor. The frame 11 also carries forwardly and downwardly extending arms 27 which carry the pulleys 20 at their lower ends and which are suspended by means of spring-rod units 28 which depend from the horizontal arms 29 that extend forwardly from the upper part of the frame 11 which includes a main tubular support 30 that has its inner end connected to the tractor frame.

As previously indicated, it is important to keep the plant roots and tops separate, to convey the roots to a receiver and to convey the tops to a point of discard. Therefore, the conveyor system 12, previously referred to, is provided. As indicated in Figure 2, this conveyor system is carried by the lower part of the frame 11. This lower part of the frame is suspended from the upper part thereof by means including the bars 35 and channel braces 36. The conveyor system 12 consists of a transversely extending conveyor 37 which extends longitudinally from the outer end of the horizontal part of the frame 11 to the upper end of the elevating conveyor section 13. The endless conveyor 37 is of the chain type and has the transverse flights 38 in the form of metal pivot rods for the chain links. The conveyor 37 is carried on a pair of sprockets 39 adjacent the outer end of the horizontal part of the frame 11 and on idler sprockets 40 located adjacent the junction of the horizontal and inclined portions of the frame and is driven by the sprockets 70 mounted at the upper end of the inclined part of the frame 11. The topper bars 25 will bridge the upper run of the conveyor 37 which will be located a short distance below the level of the bars 25, as indicated best in Figure 6. Therefore, when the roots are severed from the tops by the bars 25, they will drop down onto this conveyor 37 and will be moved inwardly towards the elevating conveyor section 13.

The tops severed by the pairs of sets of topper bars 25 of each unit 10 will be above the topper bars and, because of the relative movement of the two co-operating sets of bars, will eventually be thrown to one side or the other of such bars. To remove these tops, a top-removing endless conveyor 45 is provided between each pair of adjacent units 10 and in association with the topper bars 25 thereof. Each of these conveyors 45 extends around the endless conveyor 37, extending in an arched path over the upper run of the conveyor 37 and in a flat path beneath the lower run thereof. The arched upper run of the conveyor 45 is just slightly below the level of the topper bars 25. The conveyors 45 are thus disposed at longitudinal intervals transversely of the conveyor 37.

Each conveyor 45 is formed of chains composed of a plurality of links 46 pivoted together by transverse flight rods 47. The structure of this conveyor 45 so far described is exactly like that of the conveyor 37. However, at frequent intervals the flight bars 47 have pivoted thereto flaps 48, the purpose of which will be described later. The conveyor 45 passes over an arched guide plate 49 which is supported on the frame 11 just slightly below the level of the topper bars 25. At the rear side of the frame 11, the conveyor 45 passes around idler sprockets 50 which are carried by a shaft 51 extending longitudinally of the frame and rotatably mounted thereon by suitable bearings 52. At the forward side of the frame 11 the conveyor 45 passes around drive sprockets 53 which are keyed on a shaft 54 that is rotatably mounted in bearings 55 carried by the frame 11. The shaft 54 is driven by a chain and sprocket drive 56 from the gear box 41. The gear box 41 is driven by a chain and sprocket drive 57 from the shaft 58 driven by the power take-off of the tractor. The shaft 58 also drives a chain and sprocket drive 59 which drives the drive sprockets 40 of the conveyor 37. When the tractor power take-off is operated, it will drive the root conveyor 37 and all the associated top conveyors 45 continuously. It will also drive the conveyor belts 15 of the units 10 by means of the drives 65 and 26.

At each side of the pair of sets of bars 25 of each unit 10 there is a guide plate 60, the upper edge of which is just below the level of the bars. These plates 60 on opposite sides of the topper bars 25 of each unit 10 will serve as a guide channel for directing the severed roots downwardly from the topper bars of that unit. Between each pair of guide walls 60 there will be forward and rearward transverse inclined guide walls 61. Thus, the walls 60 and 61 form hoppers for receiving the roots and directing them onto the conveyor 37. The walls 60 also serve to guide the severed tops as they fall off the bars 25 to the conveyors 45 and will prevent them from dropping laterally off the conveyor. The severed roots and tops will be completely separated. The flaps 48 of the conveyor 45 are of greater length than the spacing of the flight bars 47 to which they are pivoted. The continuously moving conveyors 45 will carry the tops forwardly and drop them onto the ground as the machine moves along. As indicated in Figures 4 to 6, the flaps 48 are adapted to provide a continuous conveyor belt surface on the top run of each conveyor 45 but as they move along on the lower run, they swing downwardly away from the conveyor chain. This provides for a continuous surface for receiving the plant tops from the topper bars 25 to prevent them from passing downwardly between the flight rods 47 but the swinging away of the flaps, as the conveyor passes around the sprockets 53, will remove any plant tops, mud, etc., which will tend to stick to the conveyor and would stick to an ordinary belt. This insures a clean conveyor at all times to prevent jamming.

The elevating conveyor section 13 is desirable only when discharging into a relatively high body on a truck moving along with the machine. The path of movement of the conveyor 37 may be modified, as desired.

As disclosed in Patent No. 2,792,864, the forward ends of the topper bars 25 are carried by the drive heads 67 associated with the pulleys 21, as shown in Figure 6. The rear ends of the topper bars 25 are supported by the heads 68 which are rotatably carried by the brackets 69 that are mounted on the rear end of the frame 11.

In the operation of this machine, the machine will move along a plurality of rows of root crops to be harvested and each of the units 10 will operate on a single row to pick up the plants therein, maintaining them upright and carrying them rearwardly and upwardly directly between the two sets of topper bars 25 of each unit 10. The plants will be forced rearwardly between the sets of topper bars upright with the tops above the bars and the roots below the bars. As the plants are detopped, the roots will drop onto the root conveyor 37 and the severed tops will be thrown to one side or the other of the bars onto the adjacent top conveyor 45. These outwardly moving conveyors 45 will move the tops at right angles to the path of movement of the roots, away from the topping bars and will deposit them on the ground. The roots dropping onto the conveyor 37 will be conveyed continuously inwardly into association with the elevating conveyor section.

Thus, we provide a multiple row root crop harvester which has a series of harvesting units in association with a novel conveyor system which cooperates with the topping bars of the various units in such a manner that the plant roots and tops are separated and conveyed separately to predetermined points without jamming of the conveyor mechanism due to accumulation of severed tops.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A multi-row root crop harvesting machine comprising a frame mounted for movement along a plurality of rows of the crop, a plurality of harvesting units supported side-by-side on said frame in an upwardly and rearwardly inclined position, one of said units being adapted to operate on a single row of the crop, each of said units comprising an upwardly inclined conveyor unit which at its lower end will engage the plants of the root crop and convey them in upright position upwardly and rearwardly as the machine advances and topper bars disposed at the upper ends of the conveyor for receiving the upright plants therefrom and severing the tops from the roots, a plant root conveyor supported on the frame beneath said topper bars and extending laterally of said units for receiving the roots which will drop from said topper bars upon being severed from the tops, and plant top conveyors extending transversely of the first conveyor between the topper bars of adjacent units for receiving the severed tops and conveying them to a point of discard away from said root conveyor, said root conveyor being an endless conveyor and the plant top conveyors being endless conveyors spaced along the root conveyor, said endless plant top conveyors extending completely around the root conveyor, said conveyor of each of said units comprising a pair of coacting plant gripping belts and the topper bars of each of said units being divided into a pair of sets of bars extending rearwardly from the upper ends of the respective conveyor belts and aligning therewith so that the upright plants gripped by said belts are forced between the pair of sets of said bars with the roots below the bars and the tops above the bars, each set of said bars being carried at its forward end by a forward drive head concentric with a drive pulley around which the cooperating conveyor belt is passed and at its rear end by a rear head rotatably carried by the frame, each of said plant top conveyors extending upwardly at its rear end between the root conveyor and said rear heads which are disposed rearwardly of said root conveyor, means for driving said root conveyor so that the upper run thereof moves outwardly of the frame, and means for driving said top conveyors so that the upper runs thereof will move forwardly to carry the plants away from said sets of topper bars, guide walls being provided at each side of the topper bars of each unit for engaging the severed tops thrown by the topper bars to one side or the other and directing them onto the associated plant top conveyors, said walls also serving to provide hopper chutes directly beneath the topper bars of each unit for directing the severed roots therefrom onto the root conveyor.

2. A multi-row root crop harvesting machine according to claim 1 in which each plant top conveyor comprises transversely extending flight rods and flaps pivoted to certain of said rods so that they will overlap each other on the upper run of the conveyor and will hang in spaced depending relationship on the lower run of the conveyor.

References Cited in the file of this patent

UNITED STATES PATENTS

| | | |
|---|---|---|
| 1,290,049 | Bass et al. | Jan. 7, 1919 |
| 1,544,887 | Burtless | July 7, 1925 |
| 2,291,784 | Balazs et al. | Aug. 4, 1942 |
| 2,331,520 | Urschel | Oct. 12, 1943 |
| 2,625,781 | Tateyama | Jan. 20, 1953 |
| 2,792,864 | Krier et al. | May 21, 1957 |
| 2,833,358 | Lust | May 6, 1958 |